United States Patent [19]

Vu

[11] Patent Number: 6,098,771

[45] Date of Patent: Aug. 8, 2000

[54] CLUTCH WITH ON-DEMAND COOLING

[75] Inventor: Thomas H. Vu, Bolingbrook, Ill.

[73] Assignee: Case Corporation, Racine, Wis.

[21] Appl. No.: 09/304,300

[22] Filed: May 3, 1999

[51] Int. Cl.[7] ........................ F16D 13/72; F16D 25/0638
[52] U.S. Cl. .................... 192/70.12; 192/85 AA; 192/113.35
[58] Field of Search ............... 192/70.12, 109 F, 192/106 F, 113.35, 113.34, 85 AA

[56] References Cited

U.S. PATENT DOCUMENTS

| | | | |
|---|---|---|---|
| 2,642,844 | 6/1953 | Flinn | 192/85 AA X |
| 2,734,607 | 2/1956 | Hindmarch | 192/113.34 X |
| 3,010,542 | 11/1961 | Graber . | |
| 3,059,746 | 10/1962 | Christenson . | |
| 3,105,582 | 10/1963 | Ziabicki . | |
| 3,301,367 | 1/1967 | Yokel . | |
| 3,470,988 | 10/1969 | Sieverkropp | 192/109 F X |
| 3,472,350 | 10/1969 | Overson | 192/109 F X |
| 3,612,237 | 10/1971 | Honda | 192/109 F X |
| 3,647,037 | 3/1972 | Toma | 192/106 F |
| 3,677,381 | 7/1972 | Takagi et al. | 192/106 F |
| 3,712,437 | 1/1973 | Snyder . | |
| 3,834,503 | 9/1974 | Maurer et al. . | |
| 3,913,616 | 10/1975 | Horsch . | |
| 4,061,207 | 12/1977 | Ahlen . | |
| 4,077,500 | 3/1978 | Hickman, Sr. et al. . | |
| 4,134,483 | 1/1979 | Horsch . | |
| 4,157,750 | 6/1979 | Horsch . | |
| 4,270,647 | 6/1981 | Leber . | |
| 4,271,937 | 6/1981 | Hatch et al. . | |
| 4,325,471 | 4/1982 | Schuster | 192/85 AA |
| 4,442,929 | 4/1984 | Uchida | 192/109 F X |
| 4,529,073 | 7/1985 | Lewis . | |
| 4,540,078 | 9/1985 | Wetrich . | |
| 4,544,055 | 10/1985 | Kronstadt . | |
| 4,557,363 | 12/1985 | Golan . | |
| 4,624,353 | 11/1986 | Sailer et al. . | |
| 4,640,401 | 2/1987 | Koltookian . | |
| 4,644,968 | 2/1987 | Chatterjea . | |
| 4,648,495 | 3/1987 | Vater et al. . | |
| 4,753,332 | 6/1988 | Bieber et al. . | |
| 4,759,432 | 7/1988 | Jurgens et al. . | |
| 4,827,784 | 5/1989 | Muller et al. . | |
| 4,860,873 | 8/1989 | Inagaki et al. . | |
| 4,905,812 | 3/1990 | Shepperd . | |
| 5,074,394 | 12/1991 | Motohashi . | |
| 5,469,943 | 11/1995 | Hill et al. . | |
| 5,495,927 | 3/1996 | Samie et al. | 192/70.12 |
| 5,577,588 | 11/1996 | Raszkowski . | |
| 5,613,588 | 3/1997 | Vu . | |
| 5,651,288 | 7/1997 | Meeusen | 192/85 AA X |

FOREIGN PATENT DOCUMENTS

| | | |
|---|---|---|
| 58-102827 | 6/1983 | Japan . |
| 04019426 | 1/1992 | Japan . |
| 05321945 | 12/1993 | Japan . |

*Primary Examiner*—Rodney H. Bonck
*Attorney, Agent, or Firm*—Foley & Lardner

[57] ABSTRACT

A clutch is disclosed including at least one fixed member, at least one clutch plate movable between engaged and disengaged positions, a housing about the clutch plate, a piston to move the clutch plate, a pressurized fluid supply to the piston, a passage through the piston, and a valve member located proximate the passage for opening and at least partially closing the passage. Also disclosed is a clutch including at least one fixed member, at least one clutch plate movable between engaged and disengaged positions, a housing about the clutch plate, a piston to move the clutch plate, an opening through the piston, and a valve member disposed within the opening for opening and closing the passage. Also disclosed is a clutch including at least one fixed member, at least one clutch plate movable between engaged and disengaged positions, a housing about the clutch plate, a piston to move the clutch plate; a pressurized fluid supply to the piston; and a valve member located within the piston for selectively transmitting the pressurized fluid from a first end of the piston to a second end of the piston based upon the fluid pressure at the first end of the piston.

14 Claims, 5 Drawing Sheets

CLUTCH WITH ON-DEMAND COOLING

FIELD OF THE INVENTION

The present invention relates to clutches. More specifically, it relates to a clutch having a lubrication and cooling system configured to provide additional cooling when needed during clutch engagement.

BACKGROUND OF THE INVENTION

Clutches are rotational power transmission apparatus which cause a driven load to be rotated by a driver when engaged and allow the load to freewheel when disengaged. A clutch typically includes a shaft-mounted portion which is securely affixed to a shaft and which includes at least one movable clutch plate, a means of moving the clutch plate, and a piloted portion which is rotatably piloted to the shaft-mounted portion by bearings and precision fits and includes a member having a friction surface to be engaged by the clutch plate. Clutches similarly configured and having a plurality of clutch plates and friction plates are commonly used in automatic and powershift transmissions for on-highway and off-road vehicles as well.

Methods of moving clutch plates in and friction plates into and out of engagement with each other vary, with one most common method being use of hydraulic pressure of a fluid to move a piston which moves the clutch plate and the friction plate into engagement with each other.

Typically, the clutch plate and the friction plate are surrounded by a housing which forms a chamber. Lubricating fluid within the chamber lubricates the plates, bearings, and seals, and a continuous flow of the fluid carries off heat. When the clutch is engaged, the clutch plate and friction plate are not slipping with respect to each other and therefore generate no heat. However, a small amount of heat may be generated by parasitic loads such as bearing windage, lubricant churning, and seal drag. When the clutch is disengaged, some relatively minor and intermittent drag of clutch plate upon friction plate, either dry or caused by viscous shear of residual fluid, may occur which will add to the above parasitic loads. Normal lubrication and cooling needs are served while the clutch is engaged or disengaged by a low flow rate of lubricant into the chamber.

During the time that the clutch is being engaged, however, a large amount of heat is generated by slipping of the clutch plate with respect to the friction plate until one of them brings the other up to speed, particularly if a large torque or inertial load is coupled to the member being brought up to speed. To prevent degradation of the clutch plate and friction plate materials and other thermal damage to the clutch, it is necessary to remove this large amount of heat generated during the process of engagement/disengagement. This can be done by correspondingly increasing the fluid flow rate. It is not economically or technically desirable, however, to maintain the high rate of fluid flow during the relatively long periods of clutch steady state operation in disengaged or engaged conditions.

It is known to temporarily either begin or increase a flow rate of fluid during engagement of a clutch in order to dissipate the heat generated by engagement, and to either stop or reduce the flow of fluid during operation either engaged or disengaged. Some innovations have used relatively complex control systems to control fluid flow (e.g., U.S. Pat. No. 4,540,078, Wetrich, 1985; U.S. Pat. No. 4,640,401, Koltookian, 1987). Such control equipment, however, adds otherwise unnecessary expense and complexity to an otherwise simple apparatus. Others have used partial covering and uncovering of transversely oriented ports in a shaft by sliding movement of clutch parts (e.g., U.S. Pat. No. 5,577,588, Raszkowski, 1996; U.S. Pat. No. 4,529,073, Lewis, 1985; U.S. Pat. No. 4,544,055, Kronstadt, 1985; U.S. Pat. No. 4,270,647, Leber, 1981). Such devices are generally sleeve valves of a size large enough to require tightly held machining tolerances to avoid copious leakage, and are not able to compensate for repositioning due to wear of clutch plates and/or friction surfaces. Others have utilized a valve member installed in a passage formed within a shaft (e.g., U.S. Pat. No. 5,577,588, Raszkowski, 1996; U.S. Pat. No. 3,301,367, Yokel, 1967; Japanese Pat. No. 04019426A, 1992, Hirano et al.; U.S. Pat. No. 5,613,588, Vu, 1997), but it is generally preferable to include all parts of a clutch within the clutch assembly and to not have separate parts, such as valve members, which must be separately installed to a shaft.

It would be advantageous to provide for a clutch which increases flow of a cooling and lubricating fluid when engagement of the clutch creates heat, without need of complex external controls or separate valving members. It would also be advantageous to provide for such a clutch which does not utilize valving members which require stringent machining tolerances, wherein the performance of which may change when the clutch becomes worn.

SUMMARY OF THE INVENTION

An aspect of the invention pertains to a clutch rotatable about a longitudinal major axis and including at least one longitudinally fixed member, at least one clutch plate movable along the longitudinal axis between an engaged position and a disengaged position with respect to the at least one longitudinally fixed member, wherein the at least one clutch plate is independently rotatable when in the disengaged position; a housing forming a chamber disposed at least partially about the at least one clutch plate; a movable piston configured to move the at least one clutch plate along the longitudinal axis, the piston having a first end and a second end opposite the first end and adjacent to the chamber; a fluid supply configured to supply pressurized fluid to the first end of the piston to move the piston; a passage extending through the piston from the first end to the second end; and a valve member located proximate the passage, wherein the valve member is movable between a first position in which the passage is open and a second position in which the passage is at least partially occluded.

Another aspect of the invention pertains to a clutch including at least one longitudinally fixed member, at least one clutch plate movable along a longitudinal axis between an engaged position and a disengaged position with respect to the at least one longitudinally fixed member, a housing forming a chamber disposed at least partially about the at least one clutch plate, a movable piston configured to move the at least one clutch plate along the axis, the piston having a first end and a second end opposite the first end and adjacent to the chamber; an opening extending through the piston from the first end to the first end; and a valve member disposed within the opening, wherein the valve member and the opening cooperate to provide a fluid passage through the opening from the first end to the second end and wherein the valve member is movable between a first position in which the fluid passage is open and a second position in which the fluid passage is occluded.

Another aspect of the invention pertains to a clutch including at least one longitudinally fixed member, at least one clutch plate movable along a longitudinal axis between an engaged position and a disengaged position with respect to the at least one longitudinally fixed member, wherein the at least one clutch plate is independently rotatable when in the disengaged position; a housing forming a chamber disposed at least partially about the at least one clutch plate; a movable piston configured to move the at least one clutch plate along the longitudinal axis, the piston having a first end and a second end, the second end extending adjacent to the chamber opposite the first end; a fluid supply configured to supply pressurized fluid to the first end of the piston to move the piston; and valve means located within the piston for selectively transmitting the pressurized fluid from the first end of the piston to the second end of the piston based upon the fluid pressure at the first end of the piston.

DETAILED DESCRIPTION OF EXEMPLARY EMBODIMENTS

Although the descriptions herein and the figures herewith refer to a clutch (i.e., a power transmission apparatus typically mounted upon the end of a shaft and used to rotationally engage and disengage a device such as a wheel, gear, pulley, or sprocket, usually affixed to a parallel shaft), clutch couplings used for coupling of two coaxial shafts disposed in line with each other are equally within the scope and spirit of the invention.

Figure 1:
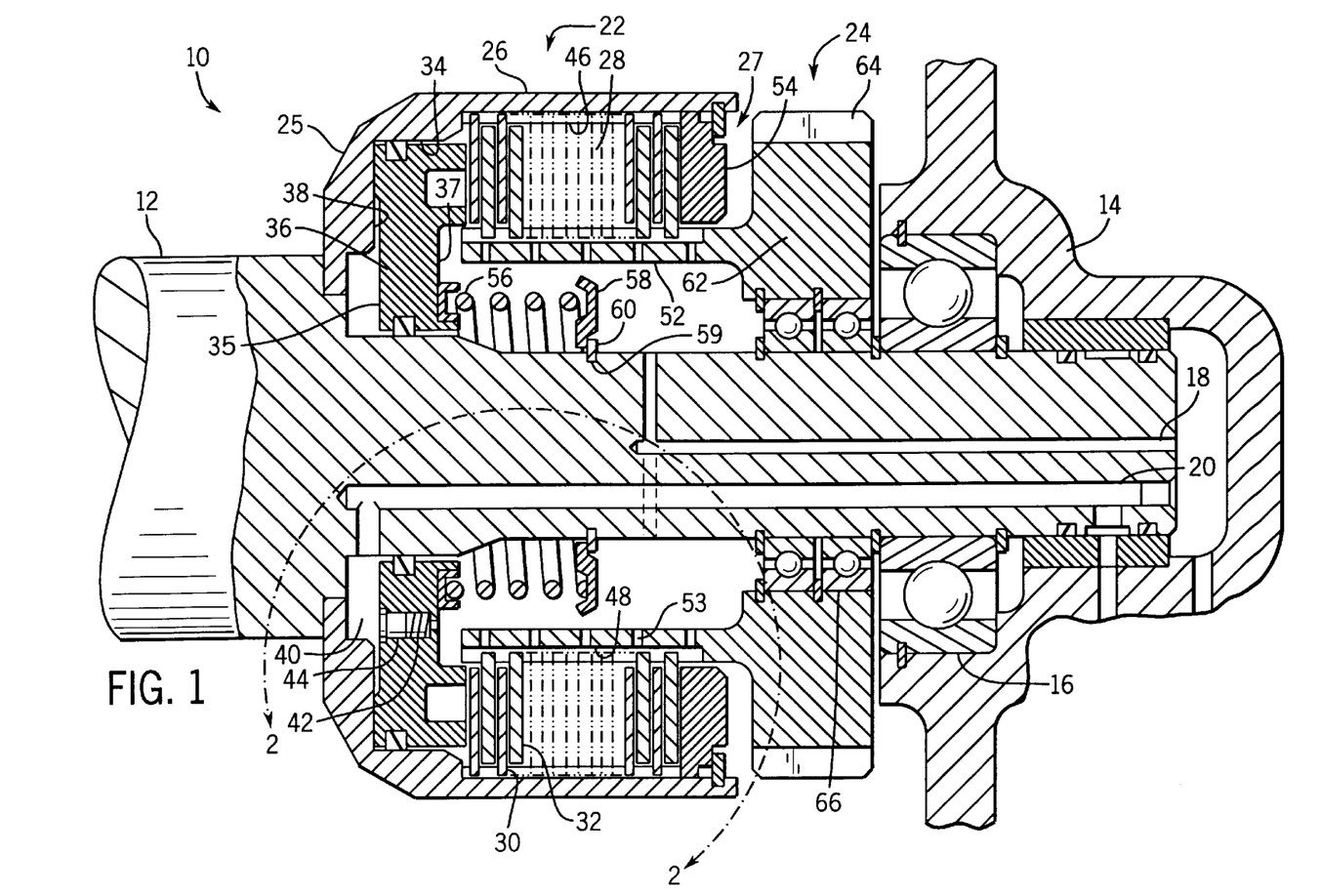
FIG. 1 is a fragmentary sectional elevation view of a machine including a preferred embodiment of a clutch.

FIG. 1 shows a clutch 10 mounted upon an end of a shaft 12, shaft 12 supported by a shaft bearing 16 with respect to a frame 14. Clutch 10 includes a clutch plate portion 22 and a friction plate portion 24. Clutch plate portion 22 includes a housing 26, a reaction plate 54, at least one clutch plate 30 (four are shown), a piston 36, a compression piston spring 56, a piston spring cup 58, and a piston spring retaining ring 60. Housing 26 is generally cylindrically shaped and hollow, is provided a closed housing first end 25 by which it is affixed to shaft 12, and is provided an open housing second end 27 which is disposed opposite housing first end 25. Reaction plate 54 is assembled to housing second end 27, housing 26 and reaction plate 54 thereby cooperating to form a chamber 28 for enclosing clutch plate 30 and a fluid 51 (shown in FIGS. 2 and 3) used for cooling and lubricating of clutch plate 30 and friction plate 32.

Shaft 12 includes a first shaft fluid passage 18, a second shaft fluid passage 20, and a means of longitudinally securing retaining ring 60; e.g., a groove 59. Housing 26 includes a bore 34 (having a floor 38) disposed adjacent housing first end 25 for movably holding piston 36. Piston 36 includes a first end 35 adjacent floor 38 in facing relationship and a second end 37 opposite first end 35 and disposed adjacent chamber 28. An annular cavity 40 is formed within floor 38 of bore 34 within housing 26, adjacent piston first end 35, and is in communication with shaft second fluid passage 20. Piston spring 56 is disposed about shaft 12 within chamber 28, and is preloaded in compression between piston second end 37 and spring cup 58, which is in turn restrained longitudinally by retaining ring 60 engaged with groove 59 within shaft 12. Piston spring 56 thereby longitudinally biases piston 36 and urges piston first end 35 into contact with floor 38 of bore 34, when a fluid 50 within cavity 40 is at little or no pressure.

Clutch plate 30 is slidably movable but rotationally retained by outer splines 46 formed within an inner wall surface of housing 26, and is thereby configured for longitudinal movement by piston 36 when fluid 50 at or above a minimum pressure bears upon piston 36 within cavity 40. Piston 36 includes an opening 42 extending through piston 36 from piston first end 35 to piston second end 37 for flow of fluid 50. A valve member 44 (described below) is located proximate opening 42, and may be repositioned at a first valve member position, a second valve member position, or any position between the two.

Friction plate portion 24 includes a hub 62, at least one friction plate 32, and a friction plate portion bearing 66. Hub 62 includes an extending member 52 projecting into chamber 28 of clutch plate portion 22. Extending member 52 is provided with inner splines 48 which slidably engage friction plate 32 so that friction plate 32 may slide longitudinally, but remain engaged rotationally, with respect to hub 62. Extending member 52 also includes a plurality of apertures 53, so that fluid within extending member 52 will easily be spun out to clutch plates 30 and friction plates 32 by centrifugal acceleration.

Hub 62 may be provided gear teeth 64 or be otherwise configured to transmit torque and power (e.g., pulley, sprocket teeth, friction wheel, etc.). Hub 62 is rotatably supported by a friction plate portion bearing 66 with respect to clutch plate portion 22 and shaft 12, to allow rotation of clutch plate portion 22 with respect to friction plate portion 24 when clutch 10 is disengaged.

Friction plate 32 and reaction plate 54 cooperate to constitute a longitudinally fixed member of clutch 10, against which piston 36 effectively clamps clutch plate 30 in order to rotationally engage clutch plate portion 22 with friction plate portion 24.

Chamber 28 is in communication with a first source (not shown) of fluid 51 at a low pressure through first shaft passage 18, the pressure sufficient to maintain a small amount of fluid 51 within chamber 28 for lubrication of bearings, seals, and, when disengaged, clutch plate 30 and friction plate 32, as well as a small flow of fluid 51 to lubricate and to remove small amounts of heat arising from parasitic losses such as bearing lubricant churning, seal drag, and any intermittent and minor friction plate 32 drag and/or viscous shear. When fully engaged or disengaged, clutch 10 does not generate any significant amount of heat.

During engagement or disengagement, however (especially the former, particularly when a high torque or inertial load is involved), a great deal of heat can be generated by slippage of clutch plate 30 with respect to friction plate 32 until one is brought up to speed with respect to the other. To avoid thermally damaging clutch 10, particularly when multiple engagements are performed in a short period of time, it is desirable to increase the flow of cooling fluid into chamber 28 during the time that clutch 10 is being engaged, engagement being effected by rapid and progressive application of an actuation pressure of fluid 50 against piston 36, the actuation pressure being sufficient to overcome the biasing force of piston spring 56 and to press clutch plate 30 against friction plate 32. Fluid 50 at actuation pressure is obtained from a second fluid source (not shown), in communication with cavity 40 through second shaft passage 20.

Figure 2:
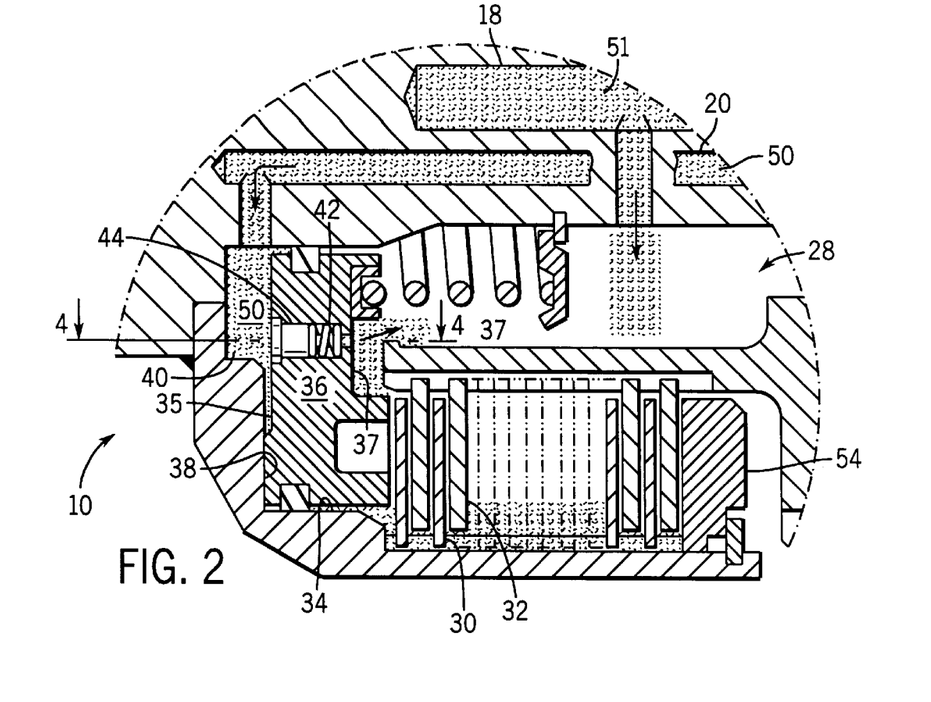
FIG. 2 is an enlarged fragmentary sectional elevation view of the clutch of FIG. 1 taken along line 2—2 within FIG. 1, wherein clutch plates are not yet engaged.

FIGS. 2 through 6 show clutch 10 in various stages of engagement. FIG. 2 shows clutch 10 at the moment fluid 50 at pressure has begun to enter cavity 40, and neither piston 36 nor valve member 44 (described below) have yet responded to the rapidly increasing pressure of fluid 50. Fluid 51 is shown entering chamber 28 through first shaft passage 18. Fluid 50 enters cavity 40 through second shaft passage 20, and then travels to chamber 28 through opening 42. Fluids 50 and 51 are of the same material, mix together within chamber 28, and may be drawn from and returned to the same reservoir. Fluid 51 is always at a low pressure and is used mainly for lubrication of clutch 10, while fluid 50 is at little or no pressure when clutch 10 is disengaged but is rapidly increased to a pressure far higher than that of fluid 51 for initiating and maintaining engagement of clutch 10.

Figure 4:
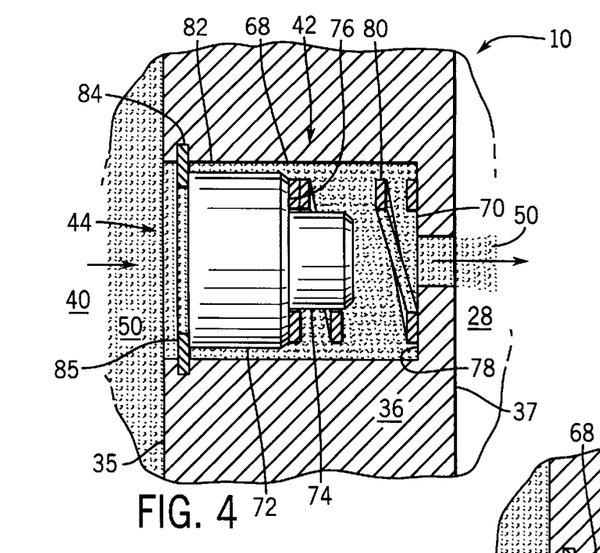
FIG. 4 is an enlarged fragmentary sectional view of the clutch of FIG. 2 taken along line 4—4 of FIG. 2 illustrating a valve member disposed in a first position with respect to a passage within a piston.

FIG. 4 shows more clearly the configuration and disposition of valve member 44 within opening 42 under the condition depicted in FIG. 2. Opening 42 has a first opening portion 68 which projects into piston 36 from piston first end 35 and is of a larger diameter, and a coaxial opening second portion 70 which projects through piston 36 into opening first portion 68 from piston second end 37 and is of a lesser diameter, opening 42 thereby having the form of a stepped bore; i.e., a counterbore having a floor, or shoulder, 78. Valve member 44 is in the form of a stepped cylinder having a valve member first portion 72 of a larger diameter, a coaxial valve member second portion 74 of a lesser diameter, and thereby a step 76. Opening first portion 68 includes a groove 84 for longitudinal securing of a retaining ring 85 near piston first end 35. Valve member 44 is captured between the retention surfaces of shoulder 78 and retaining ring 85, and a compression valve spring 80 is preloaded between shoulder 78 and step 76 to bias valve member 44 against retaining ring 85. As will be appreciated, opening 42 and valve member 44 may have various alternative configurations for selectively providing a fluid flow passage through piston 36.

Retaining ring 85 and valve member 44 are configured so that they do not seal against each other, and fluid 50 readily enters opening first portion 68 by flowing through at least one aperture extending through retaining ring 85 into an annular gap 82 existing between valve member first portion 72 and opening first portion 68. A flow passage thereby exists through piston 36, extending through opening 42, around valve member 44, and through apertures or gaps between valve member 44, retaining ring 85, and groove 84.

When pressurized fluid 50 begins to push upon valve member first portion 72, the force begins to move valve member 44 against spring 80, creating a gap between valve member first portion 72 and retaining ring 85, allowing fluid 50 to pass through gap 82 between the outer surface of valve member first portion 72 and first opening portion 68. Retaining ring 85 maintains valve member 44 in opening 42.

In alternative embodiments, retention means other than retaining ring 85 may be used as are known to those of skill in the art; e.g., piston first end may be formed over in the nature of swaging or staking at the opening of opening first portion 68, or opening first portion 68 may be internally threaded in the region adjacent to piston first end 35 and an externally threaded ring installed to opening first portion 68 to capture valve member 44.

Figure 5:
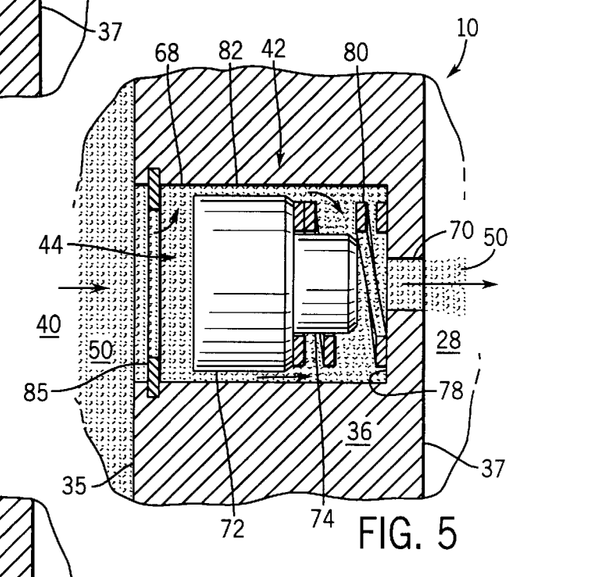
FIG. 5 is an enlarged fragmentary sectional view of the clutch of FIG. 4 illustrating the valve member disposed between the first position and a second position with respect to the passage.

Referring now to FIG. 5, annular gap 82 is preferably constructed of a size to provide a metering passage with flow area less than that of opening second portion 70. The flow area of gap 82 is selected to allow enough fluid 50 at operating temperature to enter chamber 28 through opening 42 to carry off the heat generated by engagement of clutch 10. As fluid pressure in chamber 40 is being increased to move piston 36 to the right as indicated by arrow 71 during engagement of clutch plate 30 and friction plate 32, flow through opening 42 also increases to provide additional cooling of plate 30 and 32.

Figure 6:
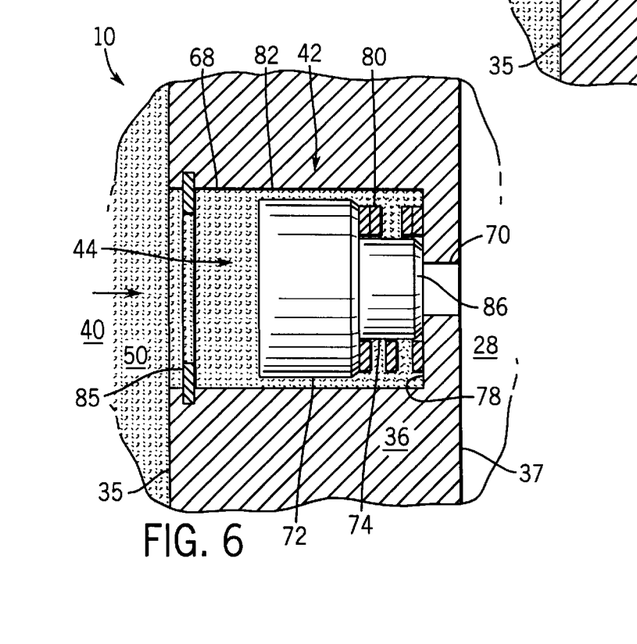
FIG. 6 is an enlarged fragmentary sectional view of the clutch of FIG. 5 taken along line 6—6 of FIG. 3 and showing the valve member in the second position with respect to the passage.

However, once the pressure of fluid 50 has attained a level sufficient for piston 36 to have moved plates 30 and 32 into complete, non-slipping engagement with one another, the fluid pressure is also large enough to move valve member 44 into sealing engagement with shoulder 78 as shown by FIG. 6. As a result, when plates 30 and 32 no longer slip relative to one another to generate increased heat, valve member 44 automatically creates the flow of fluid 50 to plates 30 and 32 via opening 42. Consequently, a presence of excess fluids 50 and 51 within chamber 28 which would otherwise reduce efficiency of clutch 10 is eliminated.

Valve member 44 and spring 80 cooperate to naturally regulate the flow of additional cooling fluid through opening 42 based upon the pressure of fluid 50 within chamber 40 and exerted upon end 35 of piston 36. The amount of fluid pressure necessary to cause valve member 44 to occlude opening 42 is dependent upon the bias force provided by spring 80. As will be appreciated, the bias force or spring constant of spring 80 will vary depending upon several factors. For any particular combination of piston 36 diameter and distance of travel between disengaged and engaged positions, fluid 50 actuation pressure rise time and flow rate, and opening second portion 70 flow area, a spring constant can be determined with which to select or design a corresponding valve spring 80 so that flow of fluid 50 will continue through annular gap 82 and opening second portion 70 until a particular actuation pressure is reached, at which point slippage and heat generation will have stopped and the additional flow is no longer needed or desired. The particular application pressure may be determined as a function of a full actuation pressure required to reach and maintain full rated torque capacity of the clutch, adjusted by a suitable service factor.

As will be appreciated, alternative valve means may be employed to actuate valve member 44 to open and close opening 42 based upon the fluid pressure at end 35 of piston 36. For example, although less desirable due to increased complexity, pressure sensors may be provided at chamber 40 or at alternative locations, wherein an actuator coupled to the sensors moves valve member 44 in response to signals generated by the sensors. Various other valve means are also contemplated.

Figure 3:
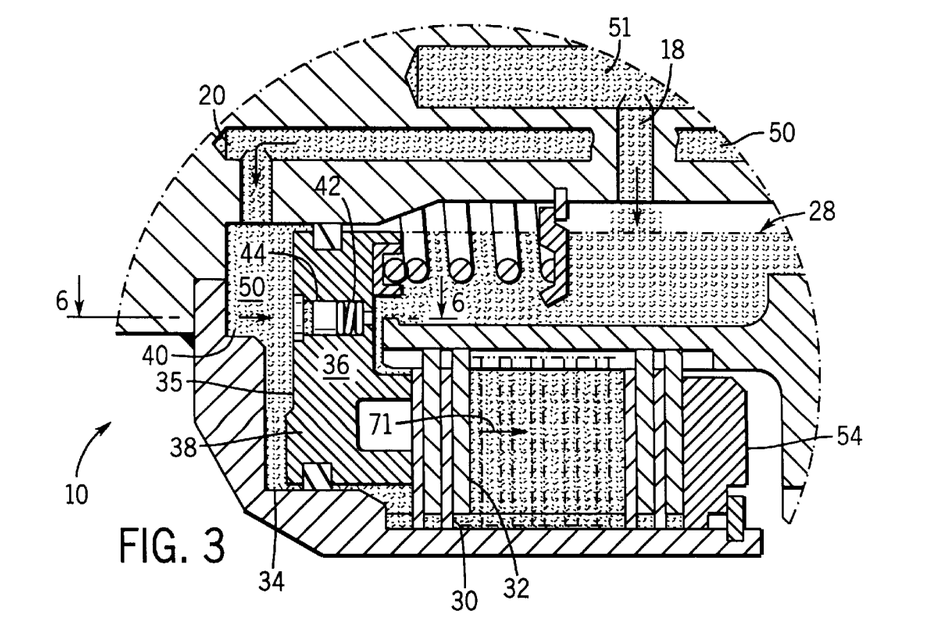
FIG. 3 is an enlarged fragmentary sectional elevation view of the clutch of FIG. 2 wherein the clutch plates are engaged.

FIG. 3 shows clutch 10 in a fully engaged condition. Fluid 50 has forced piston 36 longitudinally through bore 34, compressing piston spring 56 and clamping clutch plate 30 and friction plate 32 to reaction plate 54 (shown in FIG. 1).

FIG. 6 shows more clearly the disposition of valve member 44 under the condition shown in FIG. 3. Fluid 50 has reached full actuation pressure, valve spring 80 has impeded movement of valve member 44 for a time sufficient to allow enough fluid 50 to enter chamber 28 to carry off the heat of engagement, and a flat face 86 of valve member 44 now bears, and seals, upon shoulder 78 of opening 42 to stop flow of fluid 50 through opening second portion 70, and therefore through opening 42. Shoulder 78 thereby functions as a seat for valve member 44 to cooperate as a poppet valve. The flowing of excessive fluid 50 into chamber 28 after engagement of clutch 10, which would cause hydrodynamic drag and consequent mechanical inefficiency, is thereby averted.

Figure 7:
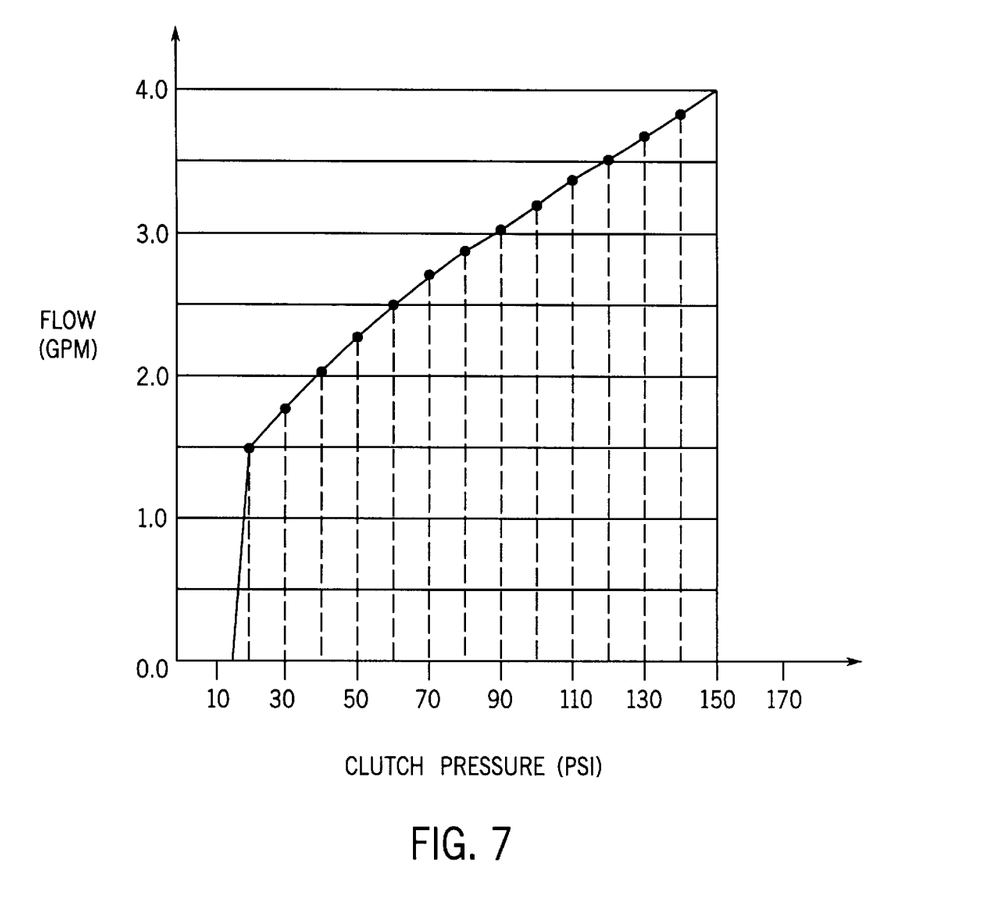
FIG. 7 is a graphical representation of fluid flow rate versus clutch pressure for the clutch of FIGS. 4, 5, and 6.

FIG. 7 shows a chart 96 of typical flow rates of fluid 50 at various actuation pressures of clutch 10. Opening first portion 68 diameter is 0.394 inches and valve member first portion 72 diameter is 0.375 inches, for a flow area equivalent of 0.012 square inches. Opening second portion 70 is of 0.120 inch diameter. Spring rate of valve spring 80 is 43.8 pounds per inch. Displacement of valve member 44 ranges up to 0.378 inches over the range of actuation pressures shown (0 through 150 pounds per square inch (psi)). Valve member 44 does not begin to move away from retaining ring 85 until actuation pressure reaches 16 psi, at which point flow rate of fluid 50 is at least partially due to leakage at the non-sealing retaining ring 85 and is approximately 1 gallon per minute (gpm). As actuation pressure increases from 16 to 150 psi, flow rate increases as shown on chart 96 to 3.951 gpm. At 150 psi, flat face 86 of valve member 44 is forced against shoulder 78 of opening 42 and flow of fluid 50 ceases.

As a result, clutch 10 provides optimal cooling of plates 30 and 32. Prior to actuation of piston 36 and engagement of plates 30 and 32, minimal cooling fluid is supplied to plates 30 and 32 by passage 18. During actuation of piston 36 and plates 30 and 32 into engagement with one another, and during which considerable heat is generated due to plates 30 and 32 slipping relative to one another, additional cooling fluid at a high pressure is supplied to chamber 28 and plates 30,32 through opening 42. This supply of additional cooling fluid increases until plates 30 and 32 become fully engaged, at which point additional cooling fluid is no longer needed and at which point valve member 44 occludes opening 42 to stop the supply of additional cooling fluid through opening 42. This optimal cooling of plates 30 and 32 is achieved by a valve means simply within piston 36. Therefore, clutch 10 is easy to manufacture, easy to assemble and easy to service.

Figure 8:
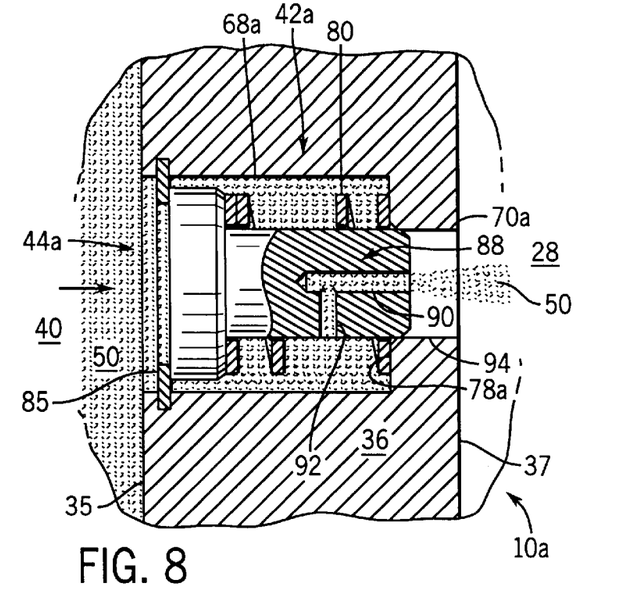
FIG. 8 is an enlarged fragmentary sectional view of an alternative embodiment of the clutch of FIGS. 1–6 including a valve member in a first position with respect to the passage.
Figure 9:
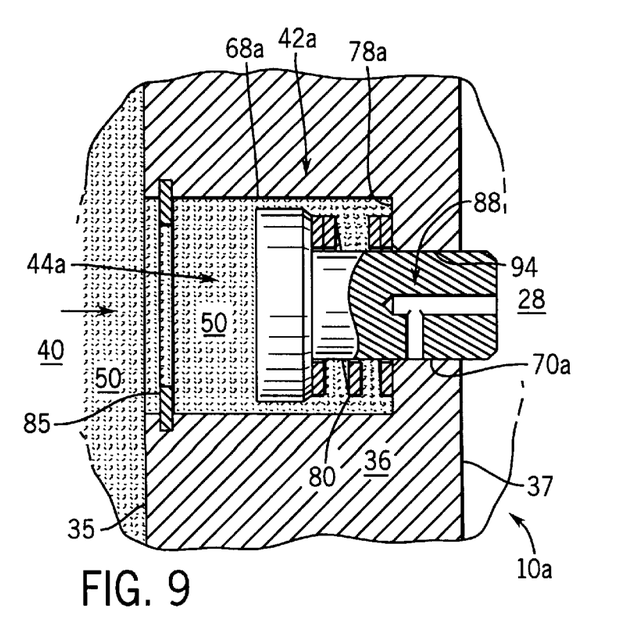
FIG. 9 is an enlarged fragmentary sectional view of the clutch of FIG. 8, wherein the valve member is in a second position with respect to the passage.

FIGS. 8 and 9 illustrate clutch 10a, an alternative embodiment of clutch 10. Clutch 10a includes an opening 42a with a first opening portion 68a and a second opening portion 70a, and a valve member 44a. Valve member 44a includes an opening third portion 88, in the form of an axially disposed blind hole 90 intersecting a radially disposed blind hole 92 and configured as a side inlet. Axially disposed blind hole 90 is always open to chamber 28, while radially disposed blind hole 92 is located along the length of valve member 44a such that it is open as a side inlet to first opening 42a and thereby allows flow of fluid 50 from cavity 40 into chamber 28, as shown in FIG. 8, when held away from shoulder 78a by valve spring 80 in the absence of fluid 50 within cavity 40 at pressures below the particular actuation pressure at which plates 30 and 32 are fully engaged without slippage and heat generation.

As shown by FIG. 9, however, radially disposed blind hole 92 is closed by a wall 94 of opening second portion 70a when valve member 44a is forced a sufficient distance from retaining ring 85 by actuation pressure of fluid 50 within cavity 40 higher than the particular actuation pressure. Valve member 44a thus cooperates with opening second portion 70a to function as a sleeve valve. The flowing of excessive fluid 50 into chamber 28 after engagement of clutch 10, which would cause hydrodynamic drag and consequent mechanical inefficiency, is again thereby averted.

Two embodiments of a clutch have thus been described, in which an opening in a piston cooperates with a valve member to temporarily provide an amount of a fluid coolant appropriate to a temporary heat load typically related to engagement of the clutch under a load. While the embodiments illustrated in the Figures and described above are presently preferred, it should be understood that these embodiments are offered only as examples. For further example, sealed and prelubricated bearings may be used, and the constant low flow rate of fluid eliminated and, with it, the corresponding first shaft passage. The clutch plate portion and the friction plate portion may be constructed with an inner sleeve member and secured to the shaft using one of the several methods known to those of skill in the art, and the clutch thereby installable in either direction upon a shaft end (i.e., with clutch plate portion or friction plate portion outermost). Other variations of construction will be obvious to those skilled in the art, but are nonetheless within the scope and spirit of the present invention. The invention is not intended to be limited to any particular embodiment, but is intended to encompass various modifications and differences of construction that fall within the scope and spirit of the appended claims.

What is claimed is:

1. A clutch rotatable about a longitudinal major axis, the clutch comprising:

at least one longitudinally fixed member;

at least one clutch plate movable along the longitudinal axis between an engaged position and a disengaged position with respect to the at least longitudinally fixed member, wherein the at least one clutch plate is independently rotatable when in the disengaged position;

a housing forming a chamber disposed at least partially about the at least one clutch plate;

a movable piston configured to move the at least one clutch plate along the longitudinal axis, the piston having a first end and a second end opposite the first end and adjacent to the chamber;

a fluid supply configured to supply pressurized fluid to the first end of the piston to move the piston;

a passage extending through the piston from the first end to the second end; and a valve member located proximate the passage, wherein the valve member is movable between a first position in which the passage is open and a second position in which the passage is at least partially occluded, wherein the piston includes an opening extending from the first end to the second end, wherein the valve member is disposed within the opening and wherein the clutch further includes a first retention surface adjacent to the passage on a first side of the valve member, and a second retention surface adjacent to the passage on a second side of the valve member, wherein the valve member is captured between the first and second retention surfaces in the opening, wherein the valve member engages the first retention surface in the first position, wherein the valve member engages the second retention surface in the second position, wherein the valve member is biased towards the first position and wherein the valve member is moved against the bias to the second position by fluid pressure from the fluid supply.

2. The clutch of claim 1 wherein the piston includes an opening extending from the first end to the second end, wherein the valve member is located within the opening and wherein the passage extends through the opening around the valve member.

3. The clutch of claim 1 wherein the piston includes an opening extending from the first end to the second end, wherein the valve member is disposed within the opening and wherein the fluid passage extends through the opening and through the valve member.

4. The clutch of claim 3 wherein the fluid passage includes a first portion axially extending partially through the valve member and a second portion radially extending from the first portion to a side inlet, wherein the side inlet communicates with the chamber when the valve member is in the first position and wherein the side inlet is sealed against the piston when the valve member is in the second position.

5. The clutch of claim 1 including a biasing member biasing the valve member towards the first position.

6. The clutch of claim 5 wherein the biasing member comprises a spring.

7. The clutch of claim 1 wherein the first retention surface comprises a seat against which the valve member seals in the second position.

8. The clutch of claim 1 wherein the second retention surface comprises a ring extending about the opening and configured to engage the valve member.

9. The clutch of claim 1 wherein the opening comprises a stepped bore having a shoulder, wherein the shoulder provides the first retention surface.

10. A clutch comprising:

at least one longitudinally fixed member;

at least one clutch plate movable along a longitudinal axis between an engaged position and a disengaged position with respect to the at least one longitudinally fixed member;

a housing forming a chamber disposed at least partially about the at least one clutch plate;

a movable piston configured to move the at least one clutch plate along the axis, the piston having a first end and a second end opposite the first end and adjacent to the chamber;

an opening extending through the piston from the first end to the first end; and a valve member disposed within the opening, wherein the valve member and the opening cooperate to provide a fluid passage through the opening from the first end to the second end, wherein the valve member is movable between a first position in which the fluid passage is open and a second position in which the fluid passage is occluded, wherein the opening includes a circumferentially extending occlusion surface in sealing engagement with the valve member, wherein the valve member includes an internal conduit having a first axial opening in fluid communication with the chamber and a second radial opening, and wherein the second radial opening is in fluid communication with the first end of the piston in the first position and wherein the second radial opening is sealed against the occlusion surface of the piston when the valve member is in the second position.

11. The clutch of claim 10 wherein the opening includes an interior shoulder, wherein the valve member is sized smaller than the opening and wherein the valve member is spaced from the shoulder in the first position and wherein the valve member is sealed against the shoulder in the second position.

12. A clutch comprising:

at least one longitudinally fixed member;

at least one clutch plate movable along a longitudinal axis between an engaged position and a disengaged position with respect to the at least one longitudinally fixed member, wherein the at least one clutch plate is fixed relative to the fixed member in the engaged position and rotates relative to the fixed member when in the disengaged position;

a housing forming a chamber disposed at least partially about the at least one clutch plate;

a movable piston configured to move the at least one clutch plate along the longitudinal axis, the piston having a first end and a second end, the second end extending adjacent to the chamber opposite the first end;

a fluid supply configured to supply pressurized fluid to the first end of the piston to move the piston; and valve means located within the piston and linearly moveable in the longitudinal direction between a first position for transmitting the pressurized fluid from the first end of the piston to the second end of the piston when the at least one clutch plate is in the disengaged position and when the piston is in contact with said at least one clutch Plate and a second position for creating transmission of pressurized fluid from the first end to the second end when the at least one clutch plate is in the engaged position.

13. The clutch of claim 12 wherein the valve means includes an opening extending through the piston from the first end to the second end and a valve member proximate the opening, wherein the valve member is movable between a first position in which the valve member cooperates with the opening to provide a fluid passage from the first end to the second end of the piston and a second position in which the valve member cooperates with the opening to fluidly seal the first end of the piston from the second end of the piston.

14. The clutch of claim 12 including means for biasing the valve member towards the first position.

* * * * *